United States Patent [19]
Brennecke

[11] 3,888,748
[45] June 10, 1975

[54] RECOVERY OF METAL VALUES FROM ORE CONCENTRATES

[75] Inventor: Henry M. Brennecke, Woodstown, N.J.

[73] Assignee: E. I. du Pont de Nemours & Co., Wilmington, Del.

[22] Filed: June 4, 1973

[21] Appl. No.: 366,876

Related U.S. Application Data

[63] Continuation-in-part of Ser. No. 267,075, June 28, 1972, abandoned.

[52] U.S. Cl. .................. 204/108; 75/117; 75/119; 75/101 R; 423/27; 423/109; 423/141 423/145; 423/151
[51] Int. Cl. ..................... C22b 3/00; C22b 15/08
[58] Field of Search ............ 423/27, 423/145, 101; 75/101 R, 117; 204/106, 108

[56] References Cited
UNITED STATES PATENTS

| | | | |
|---|---|---|---|
| 287,737 | 10/1883 | Stetefeldt | 75/101 R |
| 653,414 | 7/1900 | Fink | 75/101 R |
| 3,640,805 | 2/1972 | Knight et al. | 204/130 |
| 3,798,304 | 3/1974 | Weston | 75/117 |

*Primary Examiner*—Oscar R. Vertiz
*Assistant Examiner*—Brian E. Hearn

[57] ABSTRACT

A hydrometallurgical process to recover metal value e.g., copper, from sulfide ore concentrates, e.g., chalcopyrite, bornite and chalcocite characterized by: (1) nitric acid-sulfuric acid leach whereby the acidity is just sufficient to retain iron in solution while extracting substantially all of the copper and reducing nitrate to a low level, (2) reduction of nitrate to <1 g./liter, (3) iron precipitation as jarosite, and (4) electrowinning to recover high purity copper.

28 Claims, 1 Drawing Figure

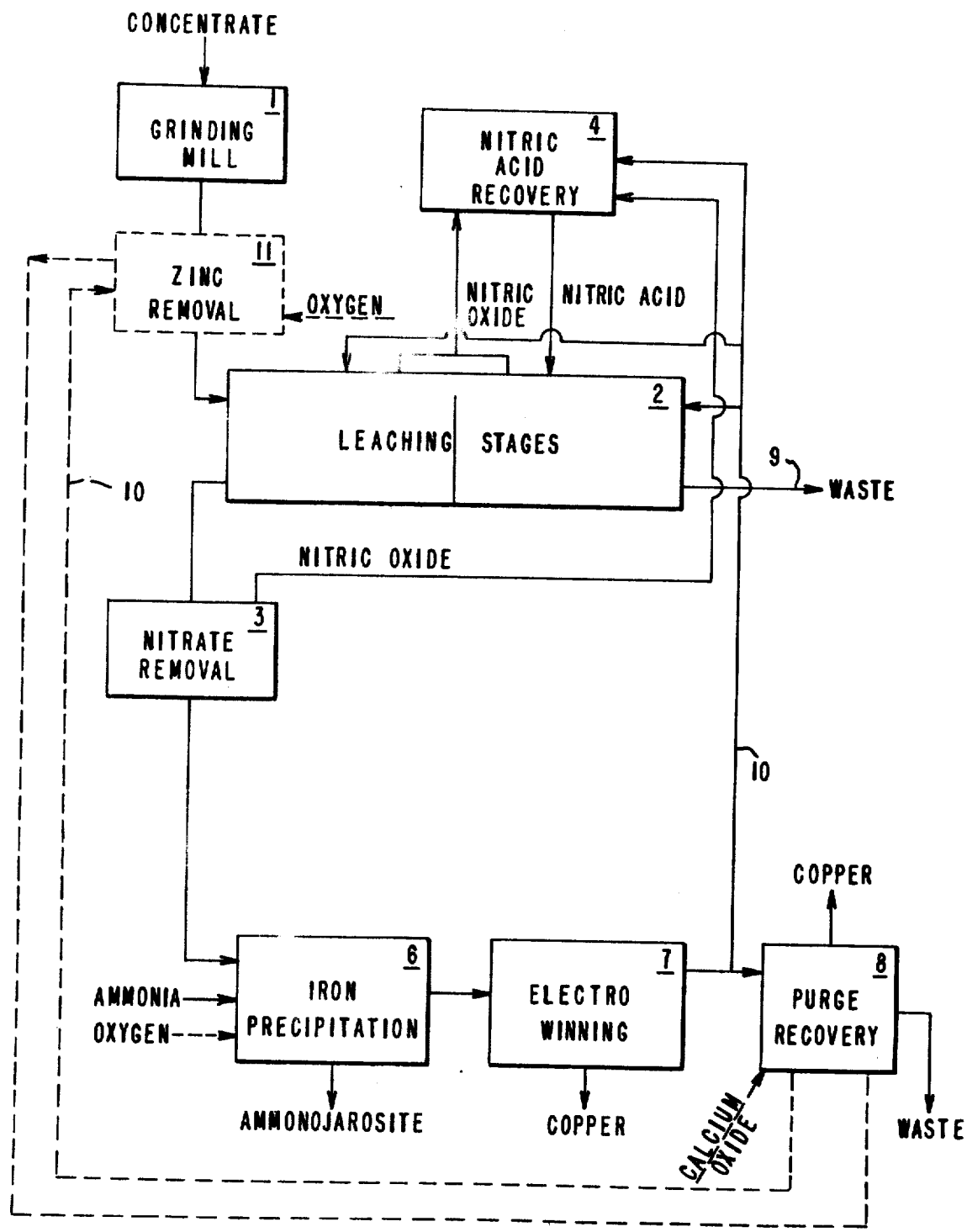

RECOVERY OF METAL VALUES FROM ORE CONCENTRATES

CROSS-REFERENCE TO RELATED APPLICATIONS

This application is a continuation-in-part of my copending application Ser. No. 267,075, now abandoned, filed on June 28, 1972, the disclosure of which is incorporated herein by reference.

BACKGROUND OF THE INVENTION

1. Field of the Invention

With the depletion of reserves of high-grade ores, the copper mining industry for some time has investigated recovering copper values from low-grade ores. Conventional processes in the industry for handling low-grade sulfide ores of copper consist of preparing ore concentrates by flotation methods and recovering copper from the concentrates by smelting and electrorefining procedures. Hydrometallurgical processes are being developed as alternatives to conventional smelting to reduce atmospheric pollution.

2. Description of the Prior Art

The use of a nitric acid-sulfuric acid leach medium to leach sulfides of copper is known, e.g., G. Bjorling and G. A. Kolta, *Oxidizing Leach of Sulfide Concentrates and Other Materials Catalyzed by Nitric Acid*. Proc. Intern. Mineral Proc. Cong., New York, N.Y., 1964; and J. D. Prater, P. B. Queneau, and T. J. Hudson, *A nitric Acid Route to Processing Copper Concentrates*, Kennecott Copper Copper Corp., Salt Lake City, Utah, 1972. U.S. Pat. No. 2,805,936 describes the use of nitric acid-sulfuric acid systems to leach ores and ore concentrates. This method of leaching has been applied to sulfide ores, e.g., in papers entitled *Hydrosulfatization of Sulfide Ore Concentrates with $HNO_3$*, P. A. Pazdnikor and P. I. Volkova., Izv. Vos. Fil. Akad. Nauk SSSR 1957, No. 9, 69–73 and *Treating Cobalt Sulfide Materials by Hydrosulfatization*, P. A. Pazdnidov and R. A. Pavlyuk, Tsvetn. Metal, 1963, 36 (5), 41–45. U.S. Pat. Nos. 3,434,947 and 3,493,365 describe processes which involve leaching of zinc with sulfuric acid and treating the resulting leach liquor with a suitable soluble salt of sodium, potassium, or ammonium, suitably the sulfate, or with ammonia, to precipitate the iron content of the liquor in the form of an insoluble double sulfate of the jarosite type.

The present invention offers various advantages over these known processes by eliminating thermal and/or chemical pretreatment (e.g., roasting), and by using high acidity, countercurrent contact of concentrate and leach liquor between leaching stages and no in situ iron precipitation during leaching thereby providing faster reaction and more complete copper recovery without the necessity for separation of incompletely leached concentrate from sulfur and gangue in order to recycle the concentrate for further leaching. The present invention exhibits a low residual nitric acid from the leaching step and minimal loss of nitrogen oxide values to $N_2O$ and $N_2$ which cannot be reconverted to nitric acid. In addition, it eliminates a separate solvent extraction step prior to recovery of substantially pure copper by electrowinning.

SUMMARY OF THE INVENTION

Copper is recovered from sulfide ore concentrates containing minerals such as chalcopyrite ($CuFeS_2$), chalcocite ($Cu_2S$), bornite ($Cu_5FeS_4$), covellite ($CuS$), digenite ($Cu_9S_5$), and the like, as well as from cement copper and from ore concentrates containing oxide copper minerals mixed with sulfide minerals by a hydrometallurgical process which comprises, or consists essentially of, a. contacting the ore concentrate with an aqueous solution of nitric and sulfuric acids, preferably until a major portion of the nitric acid is reacted, and wherein the nitrate is reduced to less than about 30 grams per liter. This step is usually conducted in the presence of fresh concentrate and/or cement copper to generate a ferrous ion concentration of at least about 2-3 parts per part of nitrate;

b. separating the liquid and solid from Step (a);

c. contacting the solids from Step (b) with an aqueous solution containing excess nitric acid with respect to the copper in said solids, preferably at a temperature of at least 85°C. until substantially all of the copper in said solids is dissolved and wherein the total amount of aqueous solution in Steps (a) and (c) contains sufficient sulfuric acid to maintain copper and iron in solution and sufficient water to produce about 2-10 parts of copper per 100 parts of liquid from Step (b);

d. separating the solids from Step (c) and directing the liquid to Step (a);

e. heating the solution from Step (b) to reduce the nitrate concentration therein, e.g., to a temperature in the range of 140°-200°C;

f. precipitating iron from the liquid from Step (e) as a jarosite by contacting said liquid with a monovalent cation selected from the class consisting of hydrogen, alkali metals and ammonium at a temperature in the range 160°-200°C.;

g. electrowinning copper from the liquid of Step (f);

h. recycling at least a portion of the liquid from Step (g) to further contact concentrate.

The process is further characterized in that oxidizing conditions in Steps (e) and (f), e.g., the presence of nitrate ion in Step (e) or molecular oxygen in Step (f) are maintained at least until substantially all of the iron is present as the ferric ion.

A liquid purge is conveniently taken from Step (h), and treated to recover copper values, e.g., by precipitation on metallic iron and to remove impurities, e.g., by precipitation.

BRIEF DESCRIPTION OF THE DRAWING

Concentrate is ground in grinding mill 1 and added to the leach system along with a stream of sulfuric and nitric acid in reactors 2 arranged to provide countercurrent flow of liquid and solids between leach stages. The leach solution is then fed to autoclave 3 where nitrate is removed as nitric oxide, which oxide along with that produced during leaching is recycled to the nitric acid recovery 4. Iron is precipitated and removed as jarosite in autoclave 6 after which the product solution is fed to electrowinning 7 where copper is recovered. Impurity levels are controlled by a purge from which residual copper is removed in purge recovery 8 and a solution of copper sulfate and free sulfuric acid recycled via line 10 for use in the leach reactors 2 and/or the nitric acid recovery 4 to provide a stream of mixed acids.

DETAILED DESCRIPTION OF THE INVENTION

The present invention is a process in which both iron and copper are taken into solution with sufficient acid employed to keep the iron in solution while extracting the major portion of the copper in the concentrate, e.g., greater than 99% of the copper in chalcopyrite is removed by the present process. The process of this invention is useful for high- or low-grade materials containing copper sulfides. Usually the starting material is a high-grade copper and iron containing sulfide concentrate obtained by selective froth flotation of copper-bearing sulfide ores. Such concentrates can contain nonferrous metals such as zinc, lead, molybdenum, nickel, tellurium, cobalt, cadmium, selenium, silver and gold in addition to copper, and the present invention contemplates these metals.

The following is a discussion of the various steps of the present process and their integration. Reference numerals correspond to the drawing.

Grinding

Since the leaching rate is increased by increasing the surface area of the mineral, it may be desirable to grind the concentrate to an optimum particle size for treatment in the process consistent with economical operation and solids handling in the process. Usually it is advantageous to grind the concentrate in a grinding mill 1 of conventional open or closed circuit design so that about 95% will pass −325 mesh standard Tyler screen.

Leaching

The purpose of the leaching step (2) is to dissolve essentially all of the copper in the concentrate, without precipitation of iron, while reducing the concentration of nitrate ion and free acidity to low levels. The flow of concentrate and leach solution is such that excess concentrate is present in the initial stage(s) and excess nitric acid is present in the final stage(s). For economic reasons it is desirable to carry out the reaction at temperatures and concentrations such that the reaction is fast and produces as high a concentration of copper in solution as is consistent with limitations of solubility and subsequent removal of nitrate and iron to provide a solution suitable for efficient electrowinning of substantially pure copper.

The overall stoichiometry of the leaching step of the process requires enough nitric acid to solubilize all of the copper and enough total acid (including that generated by oxidation of combined sulfur to sulfate) to maintain iron and copper in solution. In order to provide a solution from the initial stage of leaching that is suitable for precipitation of iron to low levels it is desirable that the acidity be as low as possible consistent with the requirements that iron remain in solution and that nitrate be reduced to a sufficiently low concentration for its removal in a later step.

Illustrative stoichiometry for the reaction of nitric acid with various minerals is given below.

Chalcopyrite $3CuFeS_2 + 9HNO_3 + 11H^+ \rightarrow 3Cu^{+++} + 2SO_4^= + 4S° + 9NO + 10H_2O$ Bornite

$3Cu_5FeS_4 + 19HNO_3 + 33H^+ \rightarrow 15Cu^{++} + 3Fe^{+++} + 9S° + 3SO_4^= + 19NO + 26H_2O$ Chalcocite

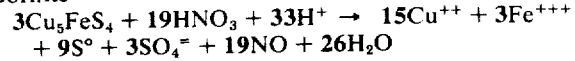
$60Cu_2S + 98HNO_3 + 222H^+ \rightarrow 120Cu^{++} + 51S° + 9SO_4^= + 98NO + 160H_2O$

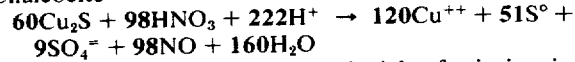
Copper minerals are also leached by ferric ion in acidic aqueous solutions. For concentrations containing relatively high iron contents, e.g., 10–40% iron, this reaction subject to the precautions set forth hereinbelow, can provide a portion of the total leaching reaction and, as will be apparent from the following discussion, also can provide the ferrous ion that is employed in the subsequent removal of residual nitrate ion. Illustrative stoichiometry for the reaction of ferric ion with chalcopyrite and with chalcocite are given below.

Chalcopyrite

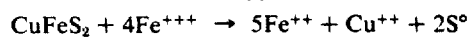
$CuFeS_2 + 4Fe^{+++} \rightarrow 5Fe^{++} + Cu^{++} + 2S°$

Chalcocite

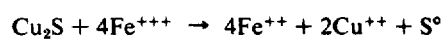
$Cu_2S + 4Fe^{+++} \rightarrow 4Fe^{++} + 2Cu^{++} + S°$

It is recognized that these stoichiometries for reaction with nitric acid and with ferric ion are overall stoichiometries and only approximate the actual stoichiometry after less than complete leaching, e.g., chalcocite reacts in at least two steps with intermediate formation of sulfide compounds having a copper-to-sulfur ratio of less than 2.

In addition to the different stoichiometry for the reaction of the various minerals with nitric acid, it has been determined that their reactivity also varies.

The reactivity of common copper minerals encountered in concentrates was found to be in the order: $Cu_2S$ (and minerals of this approximate composition such as $Cu_9S_5$) $>CuS \cong Cu_5FeS_4> CuFeS_2$ in tests in which finely ground minerals containing 3 parts of combined copper were treated with 1,200 parts of 10% $HNO_3$ at 90°C. $FeS_2$, a common constituent of concentrates, was more reactive than any copper mineral tested. The fraction of leached sulfur converted to sulfate in the above tests was as follows: $FeS_2$, >88%; $CuFeS_2$, ~35%; $CuS$, ~25%; $Cu_5FeS_4$, ~20%; $Cu_2S$, ~15%. The fraction of combined sulfur converted to sulfate after substantially complete leaching of combined sulfur is affected by temperature and concentration of nitric and sulfuric acids. A concentrate consisting mainly of $CuFeS_2$ under the preferred conditions of the process yields about one-third of the combined sulfur as sulfate with the remaining two-thirds as elemental sulfur.

In the initial leaching the concentrate is slurried with nitric and sulfuric acid obtained from subsequent leaching stages and a portion of recycle stream 10 from electrowinning 7 is added to supplement the recycled acids to a total acid of 70–90% of the amount required to dissolve all of the copper introduced in the concentrate. The temperature in this initial leaching is maintained above 50°C. and usually less than 120°C. Preferably the temperature is maintained at at least 85°C. and most preferably in the range 100°–115°C. The reaction time is in the range 1 to 4 hours. The pressure is maintained at less than 15 psig and preferably less than 10 psig. The primary objective in this leaching is to dissolve most of the copper and iron in the concentrate, to reduce the concentration of nitrate and hydrogen ions present at the end of the reaction and thereafter to produce enough ferrous iron to react with residual nitrate ions in a subsequent step for the liquid effluent from this leaching is subsequently processed through electrowinning.

The reaction of nitrate with concentrate to reduced levels of nitrate which permits subsequent removal of this residual nitrate by reaction with the ferrous ion should be accomplished before a significant amount of ferrous iron is generated. In this process ferrous ion at levels as low as five grams per liter or possibly at lower levels can decrease the reaction rate of nitrate with the concentrate and can prevent the desired reduction of nitrate. By way of explanation, but without intent to be bound thereby, it is believed that the formation of the ferrous ion is favored when the nitrate level is low, e.g., 15 grams per liter and relatively reactive concentrate, e.g., fresh concentrate is present. Such conditions can occur if the processing scheme employed involves the introduction of significant amounts of fresh concentrate throughout this initial leaching. For example, in the system employing cocurrent introduction of leach solution from the later leaching and fresh concentrate to several reactors arranged in series it was found that under a given set of conditions a weight ratio of fresh concentrate to nitrate in the leach solution of 5/1 permits the formation of the ferrous ion at nitrate levels below about 15 grams per liter, whereas under substantially similar conditions a weight ratio of 1/1 reduces the amount of highly reactive concentrate sufficiently to prevent the premature formation of significant amounts of the ferrous ion. Other techniques to control the amount of fresh reactive concentrate in contact with solution having a low nitrate level, e.g., pipeline reactors, should be apparent to those skilled in the art in view of the foregoing.

The solids from this initial stage which contain unreacted concentrate and waste products, e.g., gangue and elemental sulfur are directed to a latter leaching stage for additional treatment as described hereinbelow.

This initial leaching is illustrated in the treatment of a typical chalcopyrite concentrate ground to −325 mesh which contained 29.9% Cu, 27.1% Fe and 29.6% S. Approximately 202 parts of the above-identified concentrate are slurried in a solution of 117.5 parts of $CuSO_4 \cdot 5H_2O$, 187 parts of 95% $H_2SO_4$, and 700 parts of water at 95°C. and 223 parts of 71% $HNO_3$ were added over a period of 35 minutes. Samples taken at the indicated intervals were analyzed and showed the following results.

| Time in Minutes After all $HNO_3$ Added | Concentration, grams/liter | | | |
|---|---|---|---|---|
| | $Cu^{++}$ | $Fe^{+++}$ | $Fe^{++}$ | $NO_3^-$ |
| 5 | 55 | 30 | 0 | 31.7 |
| 20 | 61 | 36 | 0 | 19.8 |
| 35 | 63 | 37 | 1 | 12.3 |
| 50 | 64 | 37 | 1 | 7.7 |
| 65 | 63 | 40 | 0 | 5.7 |
| 115 | 65 | 40 | 0 | 4.4 |

After a major portion of the nitric acid is consumed, e.g., to a nitric acid concentration of less than 10 grams/liter (approximately 96% of the nitric acid charged in this case), the rate of reaction decreased because the residual nitric acid reacts quite slowly. Accordingly, the solution from this zone is now exposed to excess concentrate under conditions similar to those described above for a period of about 1 hour to convert a major percentage of the dissolved iron from the ferric to the ferrous state. This reaction in the presence of excess concentrate is preferably accomplished in a zone where only small amounts of nitric and/or sulfuric acid are introduced by contact of fresh concentrate and leach solution from the previous step with the production of ferrous ion going substantially to completion before the liquor in contact with excess concentrate is subsequently processed. However, the reaction can be conducted in batch by initially charging concentrate in excess as compared to the nitric and sulfuric acids and completing the reaction in the presence of unreacted concentrate. The liquid and solids are then separated, the solids are eventually directed to later stages as described below and the liquid is directed to an autoclave 3.

The generation of sufficient ferrous ion to react with the residual nitrate in a subsequent step by contacting the pregnant leach solution with excess concentrate is illustrated by the following:

The liquid products obtained from the above described experiment were separated from the solids and thereafter contacted at 95°C. with an additional 202 parts of fresh concentrate having the same composition as that initially treated. Samples were withdrawn at the indicated intervals and analyzed with the following results:

| Time (minutes) | Concentration, grams/liter | | | |
|---|---|---|---|---|
| | $Cu^{++}$ | $Fe^{+++}$ | $Fe^{++}$ | $NO_3^-$ |
| 0 | 65 | 40 | 0 | 4.4 |
| 10 | — | 26 | 14 | 3.2 |
| 40 | — | 12 | 28 | 3.2 |
| 70 | — | 8 | 32 | 3.0 |
| 130 | — | 7 | 33 | 3.8 |

The generation of the ferrous ion is apparent from the foregoing.

In the preferred method of operation the liquid from this initial leaching contains a minimum ratio of ferrous to nitrate ions to permit destruction of nitrate by simple heating as discussed hereinbelow in the section entitled "Nitrate Reduction."

More specifically, if the final nitrate ion concentration is too high it can be reduced by the addition of sulfuric acid to accelerate the reaction of nitric acid with the excess concentrate thereby achieving a lower final nitrate concentration. If the acidity of the solution in this initial stage is too high resulting in a very high reaction rate and a low final concentration of nitrate but also an undesirably high final acidity, i.e., an excess of sulfuric acid which interferes in the iron removal step, nitric acid may be added in this stage so that more copper and iron are dissolved which reaction neutralizes a portion of the excess acidity and yields a solution having an acceptable concentration of nitrate. As should be apparent from the foregoing, optimum results are obtained when the total acid concentrations are properly balanced to yield nitrate to ferrous ion ratio and free acidity in the desired range. This balance between the concentration of nitrate ion and ferrous ion is discussed in more detail hereinbelow.

The second or later leaching employs excess nitric and sulfuric acids, e.g., up to 10-fold excess, preferably with 100–300% excess of both nitric and sulfuric acids based upon the dissolvable copper and iron entering the step. This technique accelerates the leaching of the partially leached solids obtained from the first or initial leaching. Otherwise the reaction conditions are similar to those described for the initial leaching. Countercurrent flow of solids and liquids between any stages in this step is also preferred. The solids from this later leaching which consist essentially of gangue and elemental sulfur are separated and washed to recover acids and dissolved metal values (stream 9). Typically less than 1.0% of the initially charged copper appears in the solids.

In the leaching step the total amount of nitric acid and sulfuric acids and their relative amounts required in the present process vary with the mineral content of the material being processed and the reaction conditions. Generally, the amount of sulfuric acid employed is just sufficient to maintain the iron and copper in solution and the amount of nitric acid introduced is just sufficient to solubilize all the dissolvable copper and iron. For many ore concentrates and especially for chalcopyrite based upon the amount of iron and copper in the concentrate being processed, the amounts of acid employed in the leaching are 1.4–1.7 parts of sulfuric acid per part of copper, 2.0–3.0 parts of sulfuric acid per part of iron and 2.0–4.0 parts of nitric acid per part of copper with the preferred amounts being 1.5–1.6, 2.4–2.7 and 3.0–3.5, respectively. For a given set of reaction conditions the composition of the concentrate fixes the minimum amount of nitric and sulfuric acid required, e.g., chalcopyrite having 34.6% Cu, 30.5% Fe and 35.0% S requires 1.03 parts of $HNO_3$ and 0.98 parts of $H_2SO_4$ per part of $CuFeS_2$, according to the $CuFeS_2$ stoichiometry discussed above.

The leaching step is conducted in a series of at least two and, preferably, at least three stages arranged for countercurrent flow of solution and wet solids between stages. Each reactor can consist of a horizontal compartmented cylinder with the means for agitation and a cocurrent overflow of solution plus solids from one compartment to the next. Suitable materials of construction include titanium, steel lined with titanium or tantalu, brick-lined stainless steel, or brick-rubber-lined steel. Liquid/solid separation between steps can be accomplished with conventional disc filters with metallic parts in contact with the corrosive solutions made of titanium or any other suitably corrosion-resistant material.

Nitrate Reduction

Reduction of nitrate ion concentration in the solution from leaching 2 to less than about one part per 1,000 parts of solution is desirable in order to allow efficient electrowinning, especially in conventional electrowinning cells in which lead-base anodes, susceptible to corrosive attack by nitrate ion, are employed. This reduction is accomplished by increasing the temperature of the liquid from the initial step of leaching, i.e., that liquid which has been contacted with excess concentrate, to 140°–200°C. and preferably 160°–180°C. under pressure for no longer than about 45 minutes and usually 3–15 minutes, or until the following reaction nears completion.

$$3Fe^{++} + NO_3^- + 4H^+ \rightarrow 3Fe^{+++} + NO + 2H_2O$$

The solution is heated to temperature in a heat exchanger of a corrosion-resistant metal such as titanium with superheated steam as the transfer agent, then directed to an autoclave. Nitric oxide off-gas is collected and recycled to the nitric acid recovery 4.

The conditions employed in the leaching step can be adjusted to obtain the correct relative amounts of ferrous and nitrate ions; however, it is preferred to optimize the leaching conditions for maximum metal removal and then, if necessary, adjust the concentration of either the ferrous or nitrate ion taking into account the following. The ferrous ion but not the nitrate ion can be present in excess since excess ferrous ion can be oxidized to the ferric ion before or during the precipitation of the iron as jarosite but the nitrate ion must be reduced to acceptable level before the aforesaid precipitation since any residual nitrate thereafter will pass to electrowinning. The preferred conditions will usually produce a stream having at least the minimum amount of ferrous ion, however, the concentration of the ferrous ion can be increased by contacting the stream with copper, preferably "cement" copper before heating whereupon the following reaction occurs:

$$2Fe^{+++} + Cu \rightarrow 2Fe^{++} + Cu^{++}$$

The nitrate reduction is illustrated by the following:

A solution containing 29.4 parts $Fe^{++}$, 6.7 parts $Fe^{+++}$, 65 parts $Cu^{++}$ and 10.1 parts $NO_3^-$ per 1,000 parts of solution was heated to 160°C. at a pressure of 250 psig. Samples were withdrawn at the intervals indicated and analyzed for $NO_3^-$ with the following results:

| Time (minutes) | $NO_3^-$ (parts/1000 parts of solution) |
|---|---|
| 0 | 10.1 |
| 15 | 7.0 |
| 30 | 3.4 |
| 45 | 0.3 |

Under one set of conditions the relative amounts of the ferrous and nitrate ions are controlled usually by the addition of nitrate ion, so that both species are substantially completely consumed in the above discussed reaction thereby eliminating the need for additional oxidation of the residual ferrous ion to the ferric ion. This simultaneous elimination of nitrate and ferrous ions is illustrated as follows: A solution containing 6.4 parts $NO_3^-$, 20.5 parts $Fe^{+++}$, 12.9 parts $Fe^{++}$, and 54.3 parts $Cu^{++}$ per 1,000 parts of solution was charged to an autoclave and heated to 180°C. over a period of about 30 minutes following which samples of solution were withdrawn after 10 and 20 minutes and analyzed with the following results.

| Time (min.) | $NO_3^-$ | $Fe^{++}$ | $Fe^{+++}$ |
|---|---|---|---|
| 10 | 0.11 | 0.0 | 25.8 |
| 20 | 0.08 | 0.0 | 23.6 |

The foregoing data demonstrate that the reaction was substantially complete within the initial 10 minute period.

After the last sample was removed the contents of the autoclave were purged with nitrogen and 51 ml. of 28.5% ammonium hydroxide was charged. The autoclave was pressured to 300 psi with oxygen and the contents maintained at about 180°C. for approximately 20 minutes thereby precipitating the iron as ammonojarosite to a level of 2.3 parts of iron per 1,000 parts of solution. Gases other than oxygen can be used to pressurize the vessel since the foregoing data shows that the nitrate completely oxidized the ferrous ion rendering further oxidation unnecessary.

Increasing the temperature generally permits a reduction in the time required to reduce the concentration of $NO_3^-$ to the desired level. Any iron which precipitates in this step need not be removed but can be directed to the iron removal step.

Iron Removal

The current efficiency in electrowinning is seriously impaired by concentrations of iron, particularly in the ferric state, of greater than about 3–5 parts per 1,000 parts of solution. Therefore, the iron precipitation step 6 should reduce the concentration of iron to less than about 3 parts per 1,000 parts of solution. This is achieved by treating the solution with a monovalent ion selected from the class consisting of hydrogen (hydronium), alkali metals and ammonium. These ions may be obtained, for example, from ammonia and sodium sulfate, etc. The ammonium ion is preferred. The resulting solution is then heated to a temperature in the range 140°–200°C. and preferably 160°–180°C., if necessary in an oxidizing atmosphere, to assure that substantially all of the iron is in the ferric state, to precipitate iron substantially as jarosite. The jarosites are crystalline precipitates which are easily filtered and washed. When ammonium ion is employed the compound $NH_4Fe_3(SO_4)_2(OH)_6$, ammonojarosite, results according to the reaction represented by the equation:

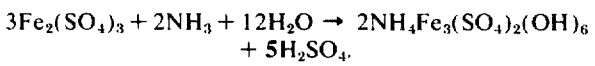

$$3Fe_2(SO_4)_3 + 2NH_3 + 12H_2O \rightarrow 2NH_4Fe_3(SO_4)_2(OH)_6 + 5H_2SO_4.$$

About 1.47 parts of $H_2SO_4$ is formed per part of iron precipitated. Any ferrous iron present after the preceding nitrate reduction step can be rapidly oxidized in this step at moderate pressures, e.g., by using molecular oxygen or other oxidants and is precipitated as jarosite. In the case of ammonojarosite and oxygen the reaction is in accordance with the equation:

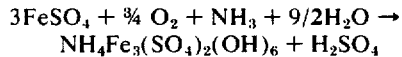

$$3FeSO_4 + \tfrac{3}{4} O_2 + NH_3 + 9/2H_2O \rightarrow NH_4Fe_3(SO_4)_2(OH)_6 + H_2SO_4$$

Any iron precipitated in the preceding nitrate reduction step is substantially removed together with the jarosite. The final free $H_2SO_4$ concentration includes $H_2SO_4$ formed in the iron precipitation step and the free $H_2SO_4$ present before the iron precipitation step. In the case of ammonojarosite the maximum free $H_2SO_4$ concentration in the final solution should be no more than about 60 parts in order to reduce the iron concentration to less than about 3.5 parts or less per 1,000 parts of solution in times of less than 1 hours. Somewhat more acid than the foregoing can be tolerated if sodium jarosite is precipitated and somewhat less can be tolerated if hydrogen jarosite is precipitated. Iron concentration is reduced in shorter times with lower final concentrations of $H_2SO_4$. Therefore, it is preferred to produce a solution of low free acid content from the leaching step and to convert a large fraction of the leached iron to the ferrous state. The concentration of iron in this step is controlled by controlling the iron in the solution from the leaching step, i.e., adjusting the amounts of concentrates and acid introduced. A basic reagent may be added to the solution before iron precipitation to reduce the free acidity but this is not preferred.

Suitable equipment for iron precipitation includes a cylindrical reactor of suitably corrosion-resistant (e.g., titanium) parts in contact with the slurry. For continuous operation a series of cocurrent reactors can be employed or a single reactor compartmented to provide a series of agitated stages through which the slurry passes in cocurrent flow. In order to prevent the precipitate from dissolving to an appreciable extent it is necessary to separate solids from liquid at temperatures or, as we prefer, to cool the slurry by heat exchange with cooling water or by flash evaporation of the slurry to a temperature of less than about 70°C. at which temperature conventional filtration (e.g., disc filters made with suitably corrosion-resistant metal parts) can be accomplished without appreciable re-solution of the iron. Thorough washing of the cake with cooled water is required to recover copper values and leave a residue suitable for discard.

Electrowinning

After precipitation and removal of the iron the resulting pregnant liquor is directed to conventional electrolytic cells 7 where approximately 40 to 75% of the copper is recovered as high purity copper by conventional electrowinning techniques. It is preferred to employ cells having a high internal rate of circulation of electrolyte such as those disclosed in U.S. Pat. No. 3,483,568, issued on Dec. 16, 1969 and U.S. Pat. No. 3,558,466, issued on Jan. 26, 1971 or any suitable means for providing a rapid flow of electrolyte across the face of the cathode. Conventional tank houses operate at 10–20 amps/ft$^2$ and reduce the copper in solution to about 1–4 parts per 100 parts of solution. Temperatures of 25–60°C. and anodes of antimonial lead are satisfactory.

Approximately 40–50% of the solution from the electrowinning stream 10 which now contains 1–3 parts of copper per 100 parts of solution is recycled to the leaching step and about 40–50% to the nitric acid recovery to produce a stream of mixed acids. The remainder, usually about 2–15% by weight and preferably 5–10% by weight of the stream, is removed as a purge 8 to control soluble impurities.

Integrated Operation

The integrated operation of the present process is illustrated by the following example which sets forth a typical cycle involving each step in the present process. The results reported are believed to closely represent those obtained in continuous operation.

Three stages of leaching were employed. The first and second stages comprised the initial leaching and the third stage comprised the later leaching as discussed hereinabove. The first and third stages were conducted in batch reactors consisting of round bottom flasks heated with mantles and fitted with agitators, condensers and thermowells. Acid and slurry were added to these batch reactors intermittently as rapidly as foaming permitted. The second stage leach was conducted in a series of five glass resin kettles arranged for cocurrent flow between kettles which were equipped with condensers and steam jackets. Baffles and agitators were also provided in the kettles to insure optimum mixing of the contents thereof and to prevent direct flow of slurry from one kettle to the next. After completion of each stage of leaching the slurry was permitted to settle. The resultant supernatant liquid was designated as overflow and the thickened slurry was designated as underflow. Iron removal was conducted in a titanium autoclave and electrowinning in cell of conventional design which was equipped with a recirculation loop. Approximately 10% of the spent electrowon solution was set aside as purge in each cycle.

In order to start up the process, two synthetic solutions were prepared to represent the predicted composition of a steady state (1) electrowon solution and (2)

solution entering a second stage leach. Solution (2) had the following composition: (the compounds added to yield the indicated ions are given in brackets).

Cu — 38 g/l — [$CuSO_4·5H_2O$]
Fe — 8 g/l — [$Fe_2(SO_4)_3·nH_2O$]
$H_2SO_4$ — 95 g/l
Zn — 3.3 g/l — [$ZnSO_4·7H_2O$]
Al — 0.93 g/l — [$Al(NO_3)_3·9H_2O$]
As — .004 g/l — [$As_2O_5$]
Sb — .005 g/l — [$Sb_2O_3$]
Bi — .004 g/l — [$Bi(NO_3)_3$] solution
Mn — .324 g/l — [$Mn(NO_3)_2$] solution
Co — .065 g/l — [$Co(NO_3)_2·6H_2O$]
Cr — .033 g/l — [$CrO_3$]
Ni — .27 g/l — [$NiSO_4·6H_2O$]
Mg — .5 g/l — [$MgSO_4$]
Na — .12 g/l — [$Na_2SO_4$]

Solution (1) contained 30 grams/liter of copper and no iron but otherwise was the same as solution (2).

Several objects were run under the general conditions set forth below for the typical cycle initially using the sunthetic solutions in leaching (Solution 2 in Stage 2 leaching) and electrowinning (Solution 1) until solutions and slurries were obtained from processing of concentrate.

A typical cycle was then conducted in the following manner using a chalcopyrite concentrate containing 27.5% copper, 24.7% iron and 30.4% sulfur by weight which was ground to permit at least 95% to pass a —325 mesh standard Tyler screen.

Leaching

The first stage leaching involved contacting the overflow solution from the second stage leaching with fresh concentrate at a temperature in the range 95°–110°C. for about 1 hour following which the slurry was permitted to settle. In a cycle the first stage leaching contacted approximately 8,500 grams of fresh concentrate with about 50 liters of overflow from stage two leaching to produce an overflow (after settling) containing 77 g/l $Cu^{++}$, 24 g/l $Fe^{++}$, 21 g/l $Fe^{+++}$ and 10 g/l $NO_3^-$. The overflow was subsequently processed through $NO_3^-$ and Fe removal, selenium/tellurium removal, then electrowinning as described below and the underflow was directed to stage two leaching.

Except for the initial cycles which employed the synthetic solution and unreacted concentrate, the second stage of leaching involved contacting the underflow from the stage one leaching with about 55 liters of a solution obtained by combining the filtrate from stage three leaching and a portion of the spent electrowon solution (less purge) from a previous cycle. A temperature of about 100°C. for a time of about 160 minutes was employed in the above-described series reactors to produce an overflow containing in part 65 g/l $Cu^{++}$ and 30 g/l $NO_3^-$. This overflow was directed to stage one leaching.

The underflow (about 8 liters) from the second stage of leaching was contacted with a portion, e.g., 20 liters, of spent electrowon solution from a previous cycle and excess nitric acid (e.g., 7–8 liters of 71% $HNO_3$) at a temperature of 90°–100°C. for about 80 minutes for the third stage leaching. The resultant slurry was filtered and the filter cake was washed and dried. The dried cake weighed about 2,900 grams and contained about 62% sulfur and 1% copper. The filtrate contained 50 g/l $Cu^{++}$, 170 g/l $NO_3^-$ and 25 g/l $Fe^{+++}$ and was directed to stage two leaching.

Nitrate Reduction and Iron Removal

The overflow from stage one leaching was charged to an autoclave and heated at 180°C. for about 10–15 minutes at 150 psig following which the contents of the autoclave were cooled to 130°C. and the pressure was reduced to 50 psig. The contents of the autoclave were purged briefly with nitrogen following which sufficient ammonium hydroxide was introduced to precipitate the iron as ammonojarosite cocurrently with an oxygen purge to insure the oxidation of any $Fe^{++}$ to $Fe^{+++}$. The contents of the autoclave were then heated at 180°C. under pressure for 30 minutes, then cooled to 80°–100°C. and filtered. The cake was washed and dried. The wash was returned to stage one leaching in a subsequent cycle. The dried cake weighed about 7,000 grams and the filtrate which contained 70 g/l $Cu^{++}$, 3–4 1 g/l $Fe^{+++}$ and <1 g/l $NO_3^-$ was directed to electrowinning after being slurried with copper powder at 50° C. for 2.5 hours to remove selenium and tellurium.

Electrowinning

A copper cathode (typically 1,800–1,900 grams) was electrowon from the above solution in a standard electrolytic cell at a current density of 20 amps/$ft^2$ and a temperature of 54°C. while circulating a solution through the cell at a rate of 0.67 gpm/$ft^2$ of cathode surface by injecting it across the face of the cathode through jets in the bottom of the cell and withdrawing it near the bottom of the anode and adding solution at a rate sufficient to maintain the copper at about 30 g/l. The spent electrowon solution (45–50 liters) was then return to leaching after approximately 10% was removed as purge.

The total volume of the system, allowing for the 10% purge remained nearly constant and the concentration of impurities did not increase upon repeated cycles but remained steady after initial cycles at the levels shown by the following analysis of the spent electrowon solution.

| Impurity | Concentration (grams/liter) |
|---|---|
| As | .007 |
| Bi | .002 |
| Sb | .003 |
| Al | .665 |
| Co | .063 |
| Zn | 3.110 |
| Se | .00002 |
| Ni | .275 |
| Mn | .181 |
| Mg | .750 |
| Ag | <.001 |

An analysis of a cathode obtained after several cycles is shown below.

Cathode Analysis

| | |
|---|---|
| Al <2.5* | Pb <3 |
| As <3 | Sb <2 |
| Bi <0.5 | Sn <0.8 |
| Fe <2.0 | Zn <2 |
| Mn <2.5* | Te <2 |
| Ni <2 | Se 0.5 |
| Ag 2 | |

*Not detectable by analytical procedure but less than the indicated amount.

The conductivity of the cathode copper was 101.654% of the International Annealed Copper Standard by A.S.T.M. B-193 and the Rockwell F hardness was 51-53 as measured on a 92 mil strip prepared by melting the copper in a graphite crucible, forming a ¾-inch slug, annealing the slug for 20 minutes at 850°C., quenching the annealed slug in water at room temperature, rolling the quenched slug into a ¾-inch square rod, annealing the rod for 20 minutes at 850°C., quenching the rod in water, drawing the quenched rod into a rod 5/16 inch in diameter, annealing the drawn rod for 30 minutes at 760°C., quenching in water, flat rolling the quenched rod into a strip 0.092 inch in thickness, annealing the strip in a molten salt bath at 275°±1°C. for 15 minutes and thereafter quenching the strip.

The foregoing example clearly demonstrates that exceptionally pure copper cathodes can be electrowon from chalcopyrite concentrates using the integrated recycle process of the present invention.

Copper can be recovered from the purge stream by any of several possible methods known in the art (e.g., precipitation on iron, precipitation as CuS by addition of $H_2S$, or neutralization followed by solvent extraction and then electrowinning) and other by-product metals can be recovered from the stream by known methods (e.g., precipitation of zinc as ZnS following precipitation of copper on iron).

Silver can be recovered as a by-product of the present process, e.g., by treatment of a small stream from one of the steps of leaching with copper powder, preferably cement copper, at 25°–100°C., whereby metallic silver is precipitated and recovered by filtration. The silver-depleted solution is then recycled to the process. As is apparent to those skilled in the art, certain metals such as selenium and tellurium interfere with electrowinning of exceptionally pure copper and if the ore being processed yields significant amounts of these metals, they may be removed prior to electrowinning by cementation on copper using, e.g., the techniques described in the above example.

Some metals such as zinc at a Zn/Cu ratio of 1/4 or higher can require an excessive purge to maintain soluble zinc below the desired limit of less than about 80 grams per liter. The zinc content of the concentrate can be reduced appreciably by initially contacting the fresh concentrate from the grinding mill 1 in a reactor 11 with the strongly acid purge stream 10 from the present process at elevated temperature, optionally under oxygen pressure to preferentially dissolve the ZnS. This schematic process is shown in dotted lines in the accompanying Figure. Copper that is leached in this operation is recovered in the purge recovery system while the zinc effectively bypasses the main process.

I claim:

1. A hydrometallurgical process for recovery of metals from ore concentrates having copper, iron and sulfur therein which comprises
   a. contacting said concentrate in an aqueous medium with a combination of nitric and sulfuric acids at a temperature of at least 50°C. until the nitrate is reduced to less than about 30 grams per liter in the presence of concentrate;
   b. separating the liquid and solid from Step (a);
   c. contacting the solids from Step (b) with an aqueous solution containing nitric acid in excess of that required to dissolve the copper in said solids at a temperature of at least 50°C. until substantially all of the copper in said solids is dissolved wherein the total amount of aqueous solution in Steps (a) and (c) contains sufficient acid to maintain copper and iron in solution and sufficient water to produce about 2–10 parts of copper per 100 parts of liquid from Step (b);
   d. separating the solids from Step (c) and directing the liquid from Step (c) to Step (a);
   e. heating the liquid from Step (b) to a temperature in the range of 140°–200°C. to reduce the nitrate concentration therein to less than about one part per 1,000 parts of solution;
   f. precipitating iron from the liquid from Step (e) as jarosite;
   g. electrowinning copper from the liquid of Step (f); and
   h. recycling at least a portion of the liquid from Step (g) to further contact concentrate;
   said process being further characterized in that oxidizing conditions are maintained in Steps (e) and (f) until substantially all of the iron is present as the ferric ion.

2. The process of claim 1 wherein Steps (a) and (c) are conducted at a temperature of at least 85°C., Step (e) is conducted at a temperature in the range 160°–180°C. and Step (f) is conducted at a temperature in the range 140°–200°C.

3. The process of claim 2 wherein the major copper containing mineral in said concentrate is selected from the class consisting of chalcopyrite, chalcocite, bornite, diginite and mixtures thereof.

4. The process of claim 1 wherein Steps (a) and (c) are conducted at a temperature in the range 100°–115°C. and Steps (e) and (f) are conducted at a temperature in the range 160°–180°C.

5. The process of claim 2 wherein ammonia or the ammonium ion is introduced in Step (f) to precipitate iron as ammonojarosite.

6. The process of claim 4 wherein ammonia or the ammonium ion is introduced in Step (f) to precipitate iron as ammonojarosite.

7. The process of claim 1 wherein Step (a) is conducted in at least two stages with countercurrent flow of liquid and solids between stages.

8. The process of claim 7 wherein Steps (a) and (c) are conducted at a temperature in the range 100°–115°C. and Steps (e) and (f) are conducted at a temperature in the range 160°–180°C.

9. The process of claim 8 wherein said concentrate consists essentially of chalcopyrite.

10. The process of claim 5 wherein no more than about 60 parts of free sulfuric acid are present in 1,000 parts of the liquid from Step (f).

11. The process of claim 2 wherein the ratio of ferrous ion to nitrate ion is controlled to permit substantially complete removal of said nitrate ion and oxidation of said ferrous ion in Step (e).

12. The process of claim 7 wherein ammonia or the ammonium ion is introduced in Step (f) to precipitate the iron as ammonojarosite.

13. The process of claim 7 wherein no more than about 60 parts of free sulfuric acid are present in 1,000 parts of the liquid from Step (f).

14. The process of claim 8 wherein ammonia or the ammonium ion is introduced in Step (f) to precipitate the iron as ammonojarosite.

15. The process of claim 13 wherein ammonia or the ammonium ion is introduced in Step (f) to precipitate the iron as ammonojarosite.

16. The process for the recovery of copper from copper sulfide concentrates containing predominantly chalcopyrite which comprises
   a. contacting said concentrate with an aqueous solution of nitric and sulfuric acids in a plurality of stages using substantially countercurrent flow of solution and solids between stages; said solution initially containing, based upon the iron and copper in said concentrate, about 1.4–1.7 parts of sulfuric acid per part of copper, about 2.0–3.0 parts of sulfuric acid per part of iron, and about 2.0–4.0 parts of nitric acid per part of copper and water to produce a solution containing about 4–9 parts of copper per 100 parts of solution and wherein nitrate is reduced to less than about 10 grams per liter in the presence of fresh concentrate;
   b. separating the liquid and solids from the initial stage of Step (a) and separating the solids from the final stage of Step (a);
   c. heating the liquid from Step (b) to a temperature in the range 160°–180°C. to reduce the nitrate concentration to less than about 1 gram per liter;
   d. precipitating iron from the liquid from Step (c) as ammonojarosite by contacting the liquid with ammonia or ammonium ion at a temperature in the range 160°–180°C;
   e. electrowinning the copper from the liquid of Step (d); and
   f. recycling at least a portion of the liquid from Step (e) to Step (a);
      said process being further characterized in that oxidizing conditions are maintained in Steps (c) and (d) until substantially all of the iron is present as the ferric ion.

17. The process of claim 16 wherein said aqueous solution of nitric and sulfuric acids in Step (a) contains 1.5–1.6 parts of sulfuric acid per part of copper, 2.5–2.7 parts of sulfuric acid per part of iron, and 3.0–3.5 parts of nitric acid per part of copper.

18. The process of claim 17 wherein the purge is taken as a portion of the liquid from Step (e).

19. The process of claim 18 wherein the concentration of ferrous ion in the liquid introduced in Step (c) is at least 2.3 parts per part by weight of nitrate ion.

20. The process of claim 16 wherein the concentration of ferrous ion in the liquid introduced in Step (c) is at least 2.3 parts per part by weight of nitrate ion.

21. A hydrometallurgical process for recovery of metals from ores having copper, iron and sulfur therein which comprises
   a. contacting said ore in an aqueous medium with a combination of nitric and sulfuric acids at a temperature of at least 50°C. until the nitrate is reduced to less than about 30 grams per liter and at least 2.0 parts by weight of ferrous ion per part by weight of nitrate is generated in the presence of ore;
   b. separating the liquid and solid from Step (a);
   c. contacting the solids from Step (b) with an aqueous solution containing nitric acid in excess of that required to dissolve the copper in said solids at a temperature of at least 50°C. until substantially all of the copper in said solids is dissolved wherein the total amount of aqueous solution in Steps (a) and (c) contains sufficient acid to maintain copper and iron in solution and sufficient water to produce about 2–10 parts of copper per 100 parts of liquid from Step (b);
   d. separating the solids from Step (c) and directing the liquid from Step (c) to Step (a);
   e. heating the liquid from Step (b) to reduce the nitrate concentration therein to less than about 1 part per 1,000 parts of solution;
   f. precipitating iron from the liquid from Step (e);
   g. electrowinning copper from the liquid of Step (f); and
   h. recycling at least a portion of the liquid from Step (g) to further contact ore;
      said process being further characterized in that oxidizing conditions are maintained in Steps (e) and (f) until substantially all of the iron is present as the ferric ion.

22. The process of claim 21 wherein the nitrate is reduced before a substantial amount of the ferrous ion is generated.

23. The process of claim 21 wherein at least 2.3 parts by weight of ferrous in per part by weight of nitrate are generated in Step (a).

24. The process of claim 23 wherein Step (e) is conducted at a temperature in the range 140°–200°C.

25. The process of claim 24 wherein no more than about 60 parts of free sulfuric acid are present in 1,000 parts of liquid from Step (f).

26. The process of claim 22 wherein the ratio of ferrous ion to nitrate ion is controlled to permit substantially complete removal of said nitrate ion and oxidation of said ferrous ion in Step (e).

27. The process of claim 22 wherein Step (a) is conducted in at least two stages with countercurrent flow of liquid and solids between stages.

28. The process of claim 24 wherein ammonia or the ammonium ion is introduced in Step (f) to precipitate iron as ammonojarosite.

* * * * *